(12) United States Patent
Moulton et al.

(10) Patent No.: US 6,270,909 B1
(45) Date of Patent: Aug. 7, 2001

(54) HIGH TEMPERATURE RELEASE FILMS

(75) Inventors: Jeffrey D. Moulton, Morristown, NJ (US); Edward L. Healy, Temecula, CA (US); Takashi Nakahara, Hiroshima (JP)

(73) Assignees: Honeywell International Inc., Morris Township, NJ (US); Mitsui Chemicals, Inc., Tokyo (JP)

(*) Notice: Subject to any disclaimer, the term of this patent is extended or adjusted under 35 U.S.C. 154(b) by 0 days.

(21) Appl. No.: 09/285,882

(22) Filed: Apr. 7, 1999

(51) Int. Cl.$^7$ ............................. B32B 27/08; B32B 27/34
(52) U.S. Cl. ........................... 428/474.4; 428/475.8; 428/476.1; 428/476.3; 428/476.9; 428/516
(58) Field of Search ..................... 428/516, 476.9, 428/475.8, 476.1, 476.3, 474.4

(56) References Cited

U.S. PATENT DOCUMENTS

| | | | |
|---|---|---|---|
| 3,480,580 | 11/1969 | Joyner et al. | 525/263 |
| 3,481,910 | 12/1969 | Brunson | 525/285 |
| 4,612,155 | 9/1986 | Wong et al. | 264/176.1 |
| 4,751,270 | 6/1988 | Urawa et al. | 525/244 |
| 5,079,052 | 1/1992 | Heyes et al. | 428/35.3 |
| 5,080,979 | 1/1992 | Shigemoto et al. | 428/520 |
| 5,106,692 | 4/1992 | Shigemoto | 428/412 |
| 5,601,770 | 2/1997 | Maglie | 264/172.19 |
| 5,858,550 * | 1/1999 | Tsai et al. | 428/474.4 |

FOREIGN PATENT DOCUMENTS

| | | |
|---|---|---|
| 57070654 | 5/1982 | (JP) . |
| WO 97 47468 | 12/1997 | (WO) . |

* cited by examiner

Primary Examiner—Leszek Kiliman
(74) Attorney, Agent, or Firm—Roger H. Criss

(57) ABSTRACT

The invention provides multilayered polymethylpentene-containing release films, processes for making the same and for their use in preparing articles comprises cured fiber reinforced epoxy, phenolic or polyacrylate compositions which file use as aerospace structural elements. The films have improved release properties when exposed to high temperatures. The films are non-oriented and multilayered comprising a polyamide layer, a polymethylpentene layer and an adhesive interlayer therebetween. The a polyamide layer has a heat stabilizer; and polyamide blend composed of from about 30% to about 80% of a nylon 6 polymer having a number average molecular weight of at least about 40,000; from about 10% to about 30% of a nylon 6,66 copolymer having a number average molecular weight of at least about 15,000; and from about 5% to about 40% of a nylon 6,12 copolymer having a number average molecular weight of at least about 10,000. The polymethylpentene layer has a heat stabilizer; and at least one polymethylpentene homopolymer, polymethylpentene containing copolymer or a blend thereof. The adhesive interlayer is attached between a surface of the polyamide layer and a surface of the polymethylpentene layer.

27 Claims, No Drawings

HIGH TEMPERATURE RELEASE FILMS

BACKGROUND OF THE INVENTION

1. Field of the Invention

The present invention relates to multilayered polymeric films and processes for making the same. More particularly, the invention pertains to polymethylpentene containing films having improved mechanical and release properties when exposed to high temperatures.

2. Description of the Prior Art

Fluorinated ethylene propylene films are commercially used as release films in producing aerospace composite structural elements under nitrogen or air pressurized heated autoclave conditions. Materials for such structural elements may contain fiber reinforced epoxy or phenolic resins. However, such films are very expensive, have a low tear strength, transfer fluorinated contaminants to the finished composite surface, is difficult to color, has a specific gravity of greater than 2.1 g/cc, and cannot be readily incinerated due to it's fluorine content.

Polymethylpentene (PMP) films such as poly-4-methyl-1-pentene film are also commercially used as release films in producing aerospace composite structural elements under nitrogen or air pressurized heated autoclave conditions. Materials for such structural elements may contain fiber reinforced epoxy or polyacrylate resins. However, PMP film is relatively expensive, have very low tear strength, high stiffness or modulus which limits its use to the production of flat parts, cannot be produced at thicknesses of less than 1.5 mil (38.1 microns) due to low tensile strength and has an upper use temperature of 177° C.

It is known in the art to produce multilayered polymeric films containing a polymethylpentene ("PMP") layer and a thermoplastic layer. For example, U.S. Pat. No. 5,106,692 discloses a delamination resistant structure of layers of PMP and various thermoplastic resins in which a specific adhesive interlayer blend is sandwiched between the layers. Thermoplastic resins may be polyamides. U.S. Pat. No. 5,858,550, which is incorporated herein by reference describes a biaxially oriented, non-thermally stabilized five layer coextruded film which has a PMP/tackifier/polyamide/tackifier/PMP construction. This film would not be acceptable as a very high temperature release film for aerospace composite structural elements because the biaxial orientation would result in release film shrinkage at elevated temperatures, resulting in the formation of defects in the surface of the composite being fabricated. In addition, the orientation process significantly increases the modulus of the film which would prohibit its use in the fabrication of complex or curvilinear composites. U.S. Pat. No. 5,080,979 describes a non-thermally stabilized multilayer laminate contain PMP/tackifier/polyamide for use as a release film in the fabrication of either rigid or flexible printed circuit boards. This film would not be acceptable for aerospace composite structural element manufacture because it would have insufficient thermal stability to withstand air autoclave pressurization, and would tend to curl, producing surface blemishes on the finished composite structure. U.S. Pat. No. 5,106,692 describes a non-thermally stabilized three layer coextruded film having the structure PMP/tackifier/polyamide. This film would not be acceptable for aerospace composite structural elements because it would have insufficient thermal stability to withstand air autoclave pressurization, and would tend to curl, producing surface blemishes on the finished composite structure.

PMP films are desirable due to their good water barrier properties as described in U.S. Pat. No. 5,079,052 and for release films for high temperature composites as described in U.S. Pat. No. 5,080,979. However, because such films typically lose their dimensional stability at temperatures in excess of about 350° F. (177° C.), these films must be cured at lower temperatures for a long period of time. It would be desirable to produce a PMP-containing film that retains its dimensional stability and release properties at high temperatures. It would further be desirable to reduce the production cycle time for high temperature composites by using a release film which can be cured both rapidly and without leaving a residue on the surface of the composites.

The present invention produces a thermally stabilized multilayered PMP/polyamide containing release film which overcomes the above problems associated with release films used in either air or nitrogen autoclaves at temperatures of up to 210° C. This significant increase in upper temperature is unexpected considering the crystalline melting points the materials used in the release film. In addition, the thermal stability of the film is maintained after exposure to air at high temperatures and pressures for extended periods of time. It has the drapability or flexibility equal to that of fluorinated ethylene propylene film. These coextruded films also significantly reduce manufacturing costs to the composite manufacturer. The film has acceptable surface quality and interlayer bond strength to produce defect free surfaces on cured structural composites.

In addition, the significant viscosity mismatch between the polymer melts employed to produce the film theoretically suggests that the viscosity of the nylon core should be reduced in order to produce an acceptable film, but it has been discovered that the opposite is true. In addition, one skilled in the art would normally expect to increase casting roll temperatures in order to increase interlayer bond strength of the crystallized coextrusion. It has also been discovered that the opposite is true for this film.

SUMMARY OF THE INVENTION

In accordance with this invention, there is provided a non-oriented, multilayered film comprising:
  a) a polyamide layer comprised of a heat stabilizer; and polyamide blend comprising:
    i) from about 30% to about 80% by weight of the blend of a nylon 6 polymer having a number average molecular weight of at least about 40,000;
    ii) from about 10% to about 30% by weight of the blend of a nylon 6,66 copolymer having a number average molecular weight of at least about 15,000;
    iii) from about 5% to about 40% by weight of the blend of a nylon 6,12 copolymer having a number average molecular weight of at least about 10,000;
  b) a polymethylpentene layer comprised of a heat stabilizer; and at least one polymethylpentene homopolymer, polymethylpentene containing copolymer or a blend thereof; and
  c) an adhesive interlayer attached between a surface of said polyamide layer and a surface of said polymethylpentene layer.

The invention also provides a non-oriented, multilayered film comprising:
  a) a polyamide layer comprised of a heat stabilizer; and polyamide blend comprising:
    i) from about 30% to about 80% by weight of the blend of a nylon 6 polymer having a number average molecular weight of at least about 40,000;
    ii) from about 10% to about 30% by weight of the blend of a nylon 6,66 copolymer having a number average molecular weight of at least about 15,000;

iii) from about 5% to about 40% by weight of the blend of a nylon 6,12 copolymer having a number average molecular weight of at least about 10,000;

b) a polymethylpentene layer comprised of a heat stabilizer; and at least one polymethylpentene homopolymer, polymethylpentene containing copolymer or a blend thereof; and c) an adhesive interlayer attached between a surface of said polyamide layer and a surface of said polymethylpentene layer;

d) an additional polymethylpentene layer comprised of a heat stabilizer; and at least one polymethylpentene homopolymer, polymethylpentene containing copolymer or a blend thereof; and e) another adhesive interlayer attached between another surface of said polyamide layer and a surface of said additional polymethylpentene layer.

The invention further provides an article which comprises

I.) a non-oriented, multilayered film comprising:
  a) a polyamide layer comprised of a heat stabilizer; and polyamide blend comprising:
    i) from about 30% to about 80% by weight of the blend of a nylon 6 polymer having a number average molecular weight of at least about 40,000;
    ii) from about 10% to about 30% by weight of the blend of a nylon 6,66 copolymer having a number average molecular weight of at least about 15,000;
    iii) from about 5% to about 40% by weight of the blend of a nylon 6,12 copolymer having a number average molecular weight of at least about 10,000;
  b) a polymethylpentene layer comprised of a heat stabilizer; and at least one polymethylpentene homopolymer, polymethylpentene containing copolymer or a blend thereof; and
  c) an adhesive interlayer attached between a surface of said polyamide layer and a surface of said polymethylpentene layer; and II.) a fiber reinforced epoxy, phenolic or polyacrylate composition applied on a surface of the multilayered film.

The above article may optionally have:
  d) an additional polymethylpentene layer comprised of a heat stabilizer; and at least one polymethylpentene homopolymer, polymethylpentene containing copolymer or a blend thereof; and
  e) another adhesive interlayer attached between another surface of said polyamide layer and a surface of said additional polymethylpentene layer.

The invention further provides a process for producing a multilayered film comprising:

I) coextruding layers comprising
  a) a polyamide layer comprised of a heat stabilizer; and a polyamide blend comprising:
    i) from about 30% to about 80% by weight of the blend of the blend of a nylon 6 polymer having a number average molecular weight of at least about 40,000;
    ii) from about 10% to about 30% by weight of the blend of a nylon 6,66 copolymer having a number average molecular weight of at least about 15,000;
    iii) from about 5% to about 40% by weight of the blend of a nylon 6,12 copolymer having a number average molecular weight of at least about 10,000;
  b) a polymethylpentene layer comprised of a heat stabilizer; and at least one polymethylpentene homopolymer, polymethylpentene containing copolymer or a blend thereof; and
  c) an adhesive interlayer attached between a surface of said polyamide layer and a surface of said polymethylpentene layer;

II) forming the coextruded layers into a multilayered film.

Optionally in the above process the film may also have coextruded thereto:
  d) an additional polymethylpentene layer comprised of a heat stabilizer; and at least one polymethylpentene homopolymer, polymethylpentene containing copolymer or a blend thereof; and
  e) another adhesive interlayer attached between another surface of said polyamide layer and a surface of said additional polymethylpentene layer to form a multilayered film.

The invention also provides a process for producing an article which comprises:

I.) providing a non-oriented, multilayered film comprising:
  a) a polyamide layer comprised of a heat stabilizer; and polyamide blend comprising:
    i) from about 30% to about 80% by weight of the blend of a nylon 6 polymer having a number average molecular weight of at least about 40,000;
    ii) from about 10% to about 30% by weight of the blend of a nylon 6,66 copolymer having a number average molecular weight of at least about 15,000;
    iii) from about 5% to about 40% by weight of the blend of a nylon 6,12 copolymer having a number average molecular weight of at least about 10,000;
  b) a polymethylpentene layer comprised of a heat stabilizer; and at least one polymethylpentene homopolymer, polymethylpentene containing copolymer or a blend thereof; and
  c) an adhesive interlayer attached between a surface of said polyamide layer and a surface of said polymethylpentene layer; and II.) applying and curing a fiber reinforced epoxy, phenolic or polyacrylate composition on a surface of the multilayered film.

Optionally the above process of producing an article may further comprise removing the cured composition from the surface of the multilayered film. Optionally in the above process of producing an article the film may also have coextruded thereto
  d) an additional polymethylpentene layer comprised of a heat stabilizer; and at least one polymethylpentene homopolymer, polymethylpentene containing copolymer or a blend thereof; and
  e) another adhesive interlayer attached between another surface of said polyamide layer and a surface of said additional polymethylpentene layer.

The film of the present invention exhibits one or more beneficial properties. Not only do the films exhibit excellent release and mechanical properties, but they also exhibit enhanced heat resistant properties and thus retain their dimensional stability at temperatures of up to about 210° C.

DETAILED DESCRIPTION OF THE PREFERRED EMBODIMENT

The film of the present invention may suitably comprise a core layer of the above described heat stabilized polyamide blend, a layer of a heat stabilized polymethylpentene homopolymer or copolymer; and a polymeric adhesive interlayer therebetween.

The a polyamide layer comprises a heat stabilizer; and polyamide blend comprising:

i) from about 30% to about 80% by weight of the blend of a nylon 6 polymer having a number average molecular weight of at least about 40,000;

ii) from about 10% to about 30% by weight of the blend of a nylon 6,66 copolymer having a number average molecular weight of at least about 15,000;

iii) from about 5% to about 40% by weight of the blend of a nylon 6,12 copolymer having a number average molecular weight of at least about 10,000.

Nylon 6 is also known as poly(caprolactam). The nylon 6 used in the practice of this invention may be obtained from commercial sources or prepared in accordance with known preparatory techniques such as through either melt polymerization or solid state polymerization of solidified chip. The nylon 6 preferably has balanced terminal end groups. Suitable nylon-6 can be obtained from AlliedSignal Inc., of Morristown N.J. under the tradename "CAPRON®. The nylon 6 useful for this invention has a number average molecular weight of at least about 40,000, preferably from about 40,000 to about 60,000 and more preferably from about 40,000 to about 50,000. Nylon 6 is present in an amount of from about 30% to about 80% by weight of the blend, preferably from about 40% to about 70% and more preferably from about 50% to about 70%.

The polyamide blend also contains a copolymer nylon 6,66 which is caprolactam/hexamethylene adipamide copolymer. The nylon 6/66 copolymer may be characterized as having a ratio of nylon 6 to nylon 66 groups of this random copolymer of from about 10:90 to about 60:40 and preferably from about 20:80 to about 30:70. A suitable copolymer is available from Solutia Inc. under the trade designation Vydyne 76HF Q294 which has an approximate ratio of nylon 6 to nylon 66 groups of 25:75. The nylon 6,66 useful for this invention preferably has a number average molecular weight of at least about 15,000, preferably from about 20,000 to about 35,000. Nylon 6,66 is present in the polyamide blend in an amount of from about 10% to about 30% by weight of the blend, preferably from about 15% to about 30% and more preferably from about 20% to about 30%.

The polyamide blend also contains a nylon 6,12 copolymer which is a caprolactam/(12-aminododecanoic acid) copolymer. The nylon 6,12 copolymer used is preferably a copolymer having a ratio of nylon 12 to nylon 6 groups of this random copolymer preferably from about 5:95 to about 15:85. A suitable copolymer is available from EMS-Chemie AG under the trade designation Grilon CR9, or CR9HV which as a ratio of nylon 12 to nylon 6 groups of approximately 10:90. Grilon CR9 has a solution viscosity, as determined in metacresol using ASTM Test Method D789-94, of 1.8, whereas CR9HV has an intrinsic viscosity of 2.2. The nylon 6,12 useful for this invention preferably has a number average molecular weight of at least about 10,000, preferably from about 15,000 to about 40,000 and more preferably from about 15,000 to about 35,000. Nylon 6,12 is present in the polyamide blend in an amount of from about 5% to about 40% by weight of the blend, preferably from about 10% to about 30% and more preferably from about 10% to about 25%. The number average molecular weights are usually determined by the formic acid viscosity method. In this method (ASTM D-789), a solution of 11 grams of aliphatic polyamide in 100 ml of 90% formic acid at 25° C. is used.

Also present in the polyamide layer is a heat stabilizer which is compatible with the polyamide blend components and is effective for deterring heat degradation to the blend. Suitable polyamide heat stabilizers nonexclusively include copper halides. Such is present in the polyamide layer in an amount of from about 1 to about 6, preferably from about 2 to about 5 and more preferably from about 2.5 to about 3.5 by weight of the polyamide blend.

The multilayered film also comprises a polymethylpentene layer which has a heat stabilizer; and at least one polymethylpentene homopolymer, polymethylpentene containing copolymer or a blend thereof. Of these, particularly preferred polymethylpentenes suitable to form multilayer films of the present invention include homopolymers and copolymers of 4-methyl-1-pentene, including copolymers of 4-methyl-1-pentene with another alpha-olefin. The other alpha-olefin may be an alpha-olefin having from about 2 to about 20 carbon atoms such as 1-butene, ethylene, propylene, 1-hexene, 1-octene, 1-decene, 1-tetradecane, and 1-octadecene. Preferably, the copolymer comprises, based upon the total molar weight of the copolymer, at least about 85 percent and more preferably at least about 90 percent of methylpentene units. Preferably, the 4-methyl-1-pentene polymer has a melt flow rate (MFR5, determined under a load of 5 kg at a temperature of 260° C.) of preferably about 0.5 to about 200 g-/10 minutes in order to provide good moldability and strength. Suitable poly(4- methylpentene) polymers (PMP) are available from Mitsui Petrochemical Company, and are designated rPX RT18, TPX MXO002, and TPX DX310.

Also present in the polymethylpentene layer is a heat stabilizer which is compatible with the polymethylpentene layer components and is effective for deterring heat degradation to the layer. Suitable polymethylpentene heat stabilizers nonexclusively include heat stabilizers available from Mitsui Petrochemical Company and designated MSH204 and MSC402. The stabilizer designated MSH204 contains both phenolic and sulfuric type stabilizers whereas the stabilizer identified as MSC402 contains phenolic, sulfuric, and phosphorous type stabilizers plus a metal deactivator. The metal deactivator has been added to protect the PMP from heavy metal, specifically copper, degradation. Polyolefins in contact with copper stabilized polyamides may show accelerated degradation versus polyolefins in contact with polyamides free of copper. Such a stabilizer is present in the PMP layer in an amount of from about 1% to about 10%, preferably from about 4% to about 8% and more preferably from about 5% to about 7% by weight of the PMP.

Between the polyamide layer and the polymethylpentene layer is an adhesive layer, also referred to in the art as a "tie" layer. Any adhesive known in the art for use with polyamides and polymethylpentene polymers are suitable for use in this invention. Illustrative of suitable adhesive polymers includes modified polyolefin compositions such as crystalline or crystallizable poly(α-olefins) and their copolymers, wherein the α-olefin monomers have between about 2 and about 6 carbon atoms. Non-limiting examples of suitable polyolefins include low, medium or high density polyethylene, linear low density polyethylene, polypropylene, polybutylene, polybutene-1, polypentene-1, poly-3-methylbutene-1, poly-4-methylpentene-1, polyhexene, and copolymers and blends thereof. Of these, preferred polyolefins are polyethylene, polypropylene, polybutylene, and copolymers and blends thereof, with polyethylene being most preferred. Preferably, the interlayer consists essentially of the polymeric adhesive.

The modified polyolefins suitable for use in conjunction with the present invention include copolymers and graft copolymers of a polyolefin and a constituent having a functional moiety selected from the group consisting of unsaturated polycarboxylic acids and acid anhydrides thereof. The unsaturated polycarboxylic acids and anhydrides include maleic acid, maleic anhydride, fumaric acid, crotonic acid, citraconic anhydride, itaconic anhydride and the like. Preferred of these are anhydrides, of which the most preferred is maleic anhydride.

The preferred modified polyolefin comprises, based upon the total weight of the modified polyolefin, from about 0.001 percent to about 10 percent, preferably from about 0.005 percent to about 5 percent, and more preferably from about 0.01 percent to about 2 weight percent of a functional moiety selected from the group consisting of unsaturated polycarboxylic acids and acid anhydrides thereof. The modified polyolefins suitable for use in this invention include compositions described in U.S. Pat. Nos. 3,481,910; 3,480,580; 4,612,155, and 4,751,270. The modified polyolefin of the present invention can further comprise between about 0 to about 40 weight percent, based on the total weight of the modified polyolefin, of thermoplastic elastomers and alkyl esters as described in U.S. Pat. No. 5,139,878. Illustrative of suitable elastomers and alkyl esters nonexclusively include ethylene methylacrylate copolymer, ethylene butylacrylate copolymer, etc. The modified polyolefins suitable for the present invention can be obtained from commercial sources, e.g. from Du Pont under the tradename "CXA". Alternatively, such modified polyolefins may be produced in accordance with the processes known to the art, including but not limited to the processes described in the aforementioned U.S. Pat. Nos. 3,481,910; 3,480,580; 4,612,155 and 4,751,270.

Another preferred adhesive layer composition comprises TLN-2 which is an acid modified polyolefin, and TLN-3 which is an acid modified polyolefin blended with poly(4-methylpentene), both of which are produced by Mitsui Petrochemical Company. Maleated polyolefins are preferred.

Although each layer of the multilayer film structure may have a different thickness, the thickness of each polymethylpentene layer and polyamide layer is preferably from about 0.05 mils (1.3 $\mu$m) to about 100 mils (2540 $\mu$m), and more preferably from about 0.05 mils (1.3 $\mu$m) to about 50 mils (1270 $\mu$m). The thickness of the adhesive layer may vary, but is generally in the range of from about 0.02 mils (0.5 $\mu$m) to about 12 mils (305 $\mu$m), preferably from about 0.05 mils (1.3 $\mu$m) to about 1.0 mils (25 $\mu$m), and most preferably from about 0.1 mils (2.5 $\mu$m) to about 0.8 mils (20 $\mu$m). While such thicknesses are preferred for providing a readily flexible film, it is to be understood that other film thicknesses may be produced to satisfy a particular need and yet fall within the scope of the present invention.

The multilayer films of the present invention can have a variety of structures so long as there is an adhesive layer between each polymer layer. A typical film structure includes a three-layer structure, which comprises a polyamide layer, an adhesive layer and a polymethylpentene layer. Another typical film structure is a five-layer structure, which comprises a polymethylpentene layer, an adhesive polymer layer, a polyamide layer, an adhesive polymer layer and a polymethylpentene layer. These are only two of many possible combinations of multilayer film structures, and any variation of the order and thickness of the layers of the polymethylpentene and polyamide layer can be made.

In addition to a PMP layer, a polyamide layer, and an adhesive layer therebetween, the films may include one or more optional layers, provided that the adhesive polymer layer is positioned between the PMP layer and the polyamide layer. Illustrative of such additional optional layers are polymeric layers formed of homopolymers and copolymers formed from $\alpha,\beta$-unsaturated monomers, such as, for example, polyolefin homopolymers such as polyethylene and polypropylene, polyvinyl alcohol, ethylene/propylene copolymer, ethylene/vinyl alcohol copolymer and blends thereof. Additional layers also include adhesive tie layers to tie the various layers together.

Each layer of the multilayer film structure can contain additives which are conventionally used in such films. Examples of such additives are pigments, dyes, slip additives, fillers, nucleating agents, plasticizers, lubricants, and stabilizers and inhibitors of oxidative, thermal and ultraviolet light.

The multilayer films of this invention may be produced by conventional methods useful in producing multilayer films, including coextrusion and extrusion lamination techniques. In the most preferred method, the film is formed by coextrusion. For example, the polyamide, polymethylpentene, and adhesive polymer layers, as well as any optional layers, are fed into infeed hoppers of extruders of like number, each extruder handling the material for one of the layers. Preferably if more than one layer of the film is comprised of the same material, then that material is extruded into its respective layers from a single extruder. For example, if both exterior layers are comprised of polymethylpentene, then the polymethylpentene is extruded into the two exterior layers from a single extruder, with the extrudate being split into the respective individual layers after it passes through both the single extruder and a feedblock co-extrusion adapter, and then emerges from the co-extrusion die. Most preferably, three extruders are used, one being for the polyamide layer, one for the adhesive polymer layer(s), and one for the polymethylpentene layer(s).

The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. In a preferred five layer embodiment of this invention where the two exterior layers are polymethylpentene, the center layer is polyamide, and the tie layers are polyolefins modified with maleic anhydride, typical operating temperatures for the first and second controlled temperatures rolls are approximately 100° F. (38° C.) and 90° F. (32° C.).

In another method, the film forming apparatus may be one which is referred to in the art as a "blown film" apparatus and includes a multi-manifold circular die head for bubble blown film through which the plasticized film composition is forced and formed into a film "bubble". The "bubble" is ultimately collapsed and formed into a film.

Processes of coextrusion to form film and sheet laminates are generally known in the art. One advantage of coextruded films is the formation of a multilayer film in a one process step by combining molten layers of each of the film layers of polymethylpentene, adhesive, and polyamide, as well as optionally more film layers, into a unitary film structure. In order to produce a multilayer film by a coextrusion process, it is necessary that the constituents used to form each of the individual films be compatible with the film extrusion process. The term "compatible" in this respect means that the film-forming compositions used to form the films have melt properties which are sufficiently similar so as to allow coextrusion. Melt properties of interest include, for example, melting points, melt flow indices, apparent viscosity, as well as melt stability. It is important that such compatibility be present to assure the production of a multilayer film having good adhesion and relatively uniform thickness across the width of the film being produced. As is known in the art, film-forming compositions which are not sufficiently compatible to be useful in a coextrusion process frequently produce films having poor interfacial lamination, poor physical properties as well as poor appearance.

One skilled in the art can readily weigh the above-noted compatibility in order to select polymers having desirable physical properties and determine the optimal combination of relative properties in adjacent layers without undue experimentation. If a coextrusion process is used, it is important that the constituents used to form the multilayer film be compatible within a relatively close temperature range in order to permit extrusion through a common die.

Alternatively, the multilayer films of the present invention can be produced by lamination whereby a multilayer film structure is formed from pre-fabricated film plies.

Typically, laminating is done by positioning the individual layers of the inventive film on one another under conditions of sufficient heat and pressure to cause the layers to combine into a unitary film. Typically the polymethylpentene, polymeric adhesive, and polyamide layers are positioned on one another, and the combination is passed through the nip of a pair of heated laminating rollers by techniques well known in the art such as those described in U.S. Pat. No. 3,355,347. Lamination heating may be done at temperatures ranging from about 75° C. to about 175° C., preferably from about 100° C. to about 175° C. at pressures ranging from about 5 psig (0.034 MPa) to about 100 psig (0.69 MPa) for from about 5 seconds to about 5 minutes, preferably from about 30 seconds to about 1 minute.

The films of this invention can be used for any purpose for which films can be used. One noteworthy characteristic of the films of this invention is that they exhibit excellent heat resistance, dimensional stability, and release properties at temperatures up to about 210° C. This feature is of particular importance, for example, in high temperature composite applications such as thermoset composite laminates in aerospace and printed circuit board release film applications. In the latter, release films are placed on top of a cover layer on the printed circuit board surface and prevent the cover layer from being bonded to a platen during hot-pressing. Unlike prior art release films which leave a residue on the printed circuit board when exposed to high temperature, the release films of the present invention permit curing of the multilayered structure at significantly higher temperatures, i.e. up to about 210° C., without warping or leaving a residue. Thus, the production cycle time is reduced.

The release films produced according to the invention are particularly useful in the production of press molded structural elements useful in the aerospace industry. The film is draped into a mold, applied with a fiber reinforced epoxy, phenolic or polyacrylate composition, pressed and cured at temperatures of up to about 210° C. Thereafter the composition is removed from the surface of the multilayered film. The composition and process details for the manufacture of such structural elements is well known from U.S. Pat. No. 5,123,985.

The following non-limiting examples serve to illustrate the invention. However, the invention should not be considered as being limited to the details thereof.

EXAMPLES

In the following examples, it is to be understood that all references to percentages when used in conjunction with the description of the constituent of a composition are to be understood as referring to percent by weight of the constituent with regard to the composition of which it forms a part. All exceptions to this convention are noted as such.

In the formation of the compositions, the nylon 6 used is a nylon 6 homopolymer which has a molecular weight of approximately 40,000, or greater, through either melt polymerization or solid state polymerization of solidified chip. The nylon 6 polymer used in these examples was produced with balanced terminal end groups. The nylon 6/66 copolymer resin used was a copolymer which may be characterized as having a ratio of nylon 6 to nylon 66 groups of this random copolymer of approximately 25:75.

This copolymer is currently available from Solutia Inc. under the trade designation Vydyne 76HF Q294. The nylon 6/12 copolymer resin used was a copolymer having a ratio of nylon 12 to nylon 6 groups of this random copolymer of approximately 10:90. This copolymer is available from EMS-Chemie AG under the trade designation Grilon CR9, or CR9HV. Grilon CR9 has a solution viscosity, as determined in metacresol using ASTM Test Method D789-94, of 1.8, whereas CR9HV has an intrinsic viscosity of 2.2. The poly(4-methylpentene) polymers (PMP) used in these examples are all available from Mitsui Petrochemical Company, and are designated TPX RT18, TPX MXOO2, and TPX DX310. The PMP heat stabilizers are also available from Mitsui Petrochemical Company and are designated MSH204 and MSC402. The stabilizer designated MS11204 contains both phenolic and sulfuric type stabilizers whereas the stabilizer identified as MSC402 contains phenolic, sulfuric, and phosphorous type stabilizers plus a metal deactivator. Admer QF500A is a maleic anhydride modified α-olefin and is commercially available from Mitsui Petrochemical Company. TLN-2 is an acid modified polyolefin, and TLN-3 is an acid modified polyolefin blended with poly(4-methylpentene) from Mitsui Petrochemical Company. The compositions optionally incorporate minor amounts of copper halide heat stabilizers and coloring agents. The copper halide class of nylon heat stabilizers is well known to those skilled in the art. Coloring agents added as color concentrates in nylon 6, are commercially available from Clariant-Reed Spectrum Corporation.

Examples 1 Through 4 (Comparative)

The compositions according to Examples 1 through 4 provide comparative examples of compositions comprising a nylon 6 homopolymer; as such these examples do not comprise a composition according to the present inventions teaching. These examples, however, illustrate that a high molecular weight nylon 6 component is required according to the present invention teaching. The constituents used to produce Examples 1 through 4 are listed in Table 1. The nylon 6 components used in Examples 1 and 4 were used without modification, whereas the nylon 6 components used in Examples 2 and 3 were producing by blending the appropriate amount of high (195 Formic Acid Viscosity (FAV)) and low (97 FAV) viscosity nylon to achieve the required melt viscosity. The formic acid viscosity can be determined by ASTM testing protocol D2857.

TABLE 1

| | Ex. 1 | Ex. 2 | Ex. 3 | Ex. 4 |
|---|---|---|---|---|
| Skin Layer Polymer | TPX RT-18 | TPX RT-18 | TPX RT-18 | TPX RT-18 |

TABLE 1-continued

|  | Ex. 1 | Ex. 2 | Ex. 3 | Ex. 4 |
|---|---|---|---|---|
| Tie Layer Polymer | TLN-2 | TLN-2 | TLN-2 | TLN-2 |
| Core Layer Polymer | 97 FAV Nylon 6 Homopolymer | 114 FAV Nylon 6 Homopolymer | 147 FAV Nylon 6 Homopolymer | 195 FAV Nylon 6 Homopolymer |

The compositions were formed by supplying the nylon core material to the feed throat of a 3.5 inch single screw extruder equipped with a general purpose mixing screw having a length over diameter ratio, "L/D", of 24/1. This extruder has five heating zones which were maintained in such a way as to produce a nylon 6 melt temperature of approximately 265 degrees Centigrade. The screw rotational speed varied from 5 to 10 rpm, depending on the FAV of the nylon 6 homopolymer. The PMP skin layer material was supplied to the feed throat of a 2 inch single screw extruder equipped with a general purpose mixing screw having a length over diameter ratio, "L/D", of 24/1. This extruder was composed of three heating zones which were maintained in such a way as to produce a PMP melt temperature of approximately 304 degrees C. The screw rotational speed was maintained at 70 rpm. The tie resin layer material was supplied to the feed throat of a 1.25 inch single screw extruder equipped with a general purpose mixing screw having a length over diameter ratio, "L/D", of 24/1. This extruder was composed of three heating zones which were maintained in such a way as to produce a tie resin melt temperature of approximately 245 degrees C. The screw rotational speed was maintained at 40 rpm. The extrudate exiting the extruders passed through a five layer feedblock and was then forced into a conventional film forming die head of the "coathanger" type, which had a die gap of 0.030 inches, and a width of 54 inches. The die head was maintained at a temperature of 290 degrees C., the rate of film production was approximately 90 feet/minute. The extruded film was contacted with a casting roll whose temperature was maintained at approximately 85 degrees C., and a heat set roll maintained at approximately 95 degrees C., both rolls were driven at the same speed. A finished film having a width if 45 inches and a thickness of approximately 1 mil was produced therefrom.

The quality of the film produced was determined to be acceptable if no flow disturbances were noted across the cast film. The results of these observations are outlined in TABLE 2.

TABLE 2

| Example 1 | Example 2 | Example 3 | Example 4 |
|---|---|---|---|
| Unacceptable film quality | Unacceptable film quality | Unacceptable film quality | Acceptable film quality |

Examples 5–8 (Comparative) and 9–13 (Invention)

The composition according to Example 5 provides a comparative example of a composition comprising non-heat stabilized compositions; as such this example does not comprise a composition according to the present inventions teaching. The constituents used to form the compositions according to examples 5 through 13 are listed in their respective weight percentages in TABLE 3. For each composition, the constituents were processed on equipment similar to that discussed in Examples 1 through 4, although in some instances the die width was 67".

| | EXAMPLE 5 | EXAMPLE 6 | EXAMPLE 7 | EXAMPLE 8 | EXAMPLE 9 | EXAMPLE 10 | EXAMPLE 11 | EXAMPLE 12 | EXAMPLE 13 |
|---|---|---|---|---|---|---|---|---|---|
| Skin Composition | TPX RT18 | TPX RT18 | TPX MX002 | TPX MX002 | 94:6 TPX MX002: MSC402 | 94:6 TPX MX002: MSH204 | 94:6 TPX MX002: MSH204 | 94:6 TPX MX002: MSH204 | 94:6 TPX MX002: MSH204 |
| Skin Polymer Melt Temperature (° C.) | 316 | 316 | 316 | 324 | 324 | 324 | 324 | 313 | 316 |
| Tie Composition | Admer QF500A | Admer QF500A | Admer QF500A | Admer QF500A | Admer QF500A | Admer QF500A | Admer QF500A | Admer QF500A | TLN-3 |
| Tie Polymer Melt Temperature (° C.) | 260 | 260 | 268 | 279 | 279 | 282 | 263 | 266 | 288 |
| Core Composition | 195 FAV Nylon 6 | 80:20 195 FAV Nylon 6: Vydyne 76HF Q294 | 60:25:15 195 FAV Nylon 6: Vydyne 76HF Q294: Grilon CR9 | 60:25:15 195 FAV Nylon 6: Vydyne 76HF Q294: Grilon CR9 | 60:25:15 195 FAV Nylon 6: Vydyne 76HF Q294: Grilon CR9 | 60:25:15 195 FAV Nylon 6: Vydyne 76HF Q294: Grilon CR9 | 60:25:15 195 FAV Nylon 6: Vydyne 76HF Q294: Grilon CR9 | 60:25:15 195 FAV Nylon 6: Vydyne 76HF Q294: Grilon CR9HV | 60:25:15 195 FAV Nylon 6: Vydyne 76HF Q294: Grilon CR9HV |
| Core Polymer Melt Temperature (° C.) | 277 | 277 | 271 | 271 | 271 | 271 | 249 | 254 | 254 |
| Additional Copper Halide Heat Stabilizer (w/w) | 0% | 0% | 3% | 5% | 5% | 5% | 4% | 3% | 2% |
| Color Concentrate (w/w) | 0% | 0% | 0% | 0% | 0% | 0% | 1% | 2% | 2% |

The physical properties of the individual constituents were evaluated in both the machine and transverse directions on both heat aged and non-heat aged samples in accordance with the ASTM D882 test protocol, reported in kg/cm$^2$. The samples were heat aged by placing 1" wide by 10" long strips of film into a 177 degree C. forced air oven for time intervals varying from four to 40 hours. The results of these tests are outlined in TABLE 4. It is key to the functionality of composite release films that these materials maintain their mechanical integrity after autoclave exposure to heat and temperature, in order to prevent contamination of the cured composite from pieces of film, which may weaken the composite structures.

TABLE 4

|  | EXAMPLE 5 | EXAMPLE 6 | EXAMPLE 7 | EXAMPLE 8 | EXAMPLE 9 | EXAMPLE 10 | EXAMPLE 11 | EXAMPLE 12 | EXAMPLE 13 |
|---|---|---|---|---|---|---|---|---|---|
| MD Ultimate Elongation Before Aging (%) | 310 | 310 | 320 | 325 | 360 | 335 | 304 | 310 | 310 |
| TD Ultimate Elongation Before Aging (%) | 380 | 380 | 390 | 360 | 380 | 335 | 380 | 390 | 370 |
| MD Ultimate Elongation, 4 Hour Aging (%) | <30 | 300 | 380 | Did Not Determine | Did Not Determine | Did Not Determine | Did Not Determine | Did Not Determine | Did Not Determine |
| TD Ultimate Elongation, 4 Hour Aging (%) | <30 | 300 | 280 | Did Not Determine | Did Not Determine | Did Not Determine | Did Not Determine | Did Not Determine | Did Not Determine |
| MD Ultimate Elongation, 16 Hour Aging (%) | <30 | <30 | 330 | Did Not Determine | Did Not Determine | Did Not Determine | Did Not Determine | Did Not Determine | Did Not Determine |
| TD Ultimate Elongation, 16 Hour Aging (%) | <30 | <30 | 290 | Did Not Determine | Did Not Determine | Did Not Determine | Did Not Determine | Did Not Determine | Did Not Determine |
| MD Ultimate Elongation, 40 Hour Aging (%) | <30 | <30 | <30 | <30 | <30 | 116 | 215 | 250 | 280 |
| TD Ultimate Elongation, 40 Hour Aging (%) | <30 | <30 | <30 | <30 | <30 | 70 | 315 | 230 | 260 |

From the heat aging results shown in TABLE 4 it may be seen that in order to achieve acceptable heat aging characteristics, i.e. an elongation of greater than 100% after heat aging, for the desired application one must stabilize both the PMP skin and polyamide core layers. Example 5 shows that the molecular weight of the nylon 6 resin alone is not sufficient to achieve acceptable thermal aging characteristics. The addition of a heat stabilized nylon 6,66, as shown in EXAMILE 6, does not significantly improve the heat aging characteristics of the film nor would the film of this example be acceptable for the applications of this teaching. Similarly, by still further increasing the amount of copper halide heat stabilizer in the nylon layer it is possible to increase the thermal aging characteristics of the film, as shown by EXAMPLES 7 and 8, but the amount of increased stabilization is still insufficient to produce a film with an acceptable degree of thermal resistance. In addition to stabilizing the nylon layer it is also possible to stabilize the PMP layer. We have discovered that the type of PMP heat stabilizer used in the PMP layer is an important factor to the production of a release film which will withstand the effects of both high temperature and pressure. Of the two types of PMP heat stabilizers tested one would predict that MSC402 would be the preferred material due to the addition of the phosphorus type stabilizer and the metal deactivator. It was initially assumed that metal, specifically copper, deactivation would be required to render the films of this invention to be acceptable for the desired use because it is well known that copper accelerates the degradation of polyolefins, including PMP. It has been shown in EXAMPLES 6 through 8 that copper halides are the preferred stabilizers for the nylon layer of the film. Surprisingly, it has been discovered that the use of the PMP heat stabilizer without either the additional phosphorous heat stabilizer or metal deactivator, as shown in EXAMPLE 10, resulted in at least a three fold improvement in film elongation to break after heat aging at 177° C. for 40 hours when compared with the PMP heat stabilizer used to produce EXAMPLE 9. It has also been discovered that the combined amount of PMP and nylon heat stabilizers is also important to producing a release film acceptable for aircraft composite fabrication. In comparing EXAMPLES 10 and 11 it may be seen that if the amount of nylon heat stabilizer is reduced, while the amount of PMP heat stabilizer is held constant, one can still further increase the elongation at break of a film aged at 177° C. for 40 hours in air. This is a very surprising result, as it is normally assumed that the nylon copper halide heat stabilizer is sacrificial, meaning that it is consumed during the heat aging. This concept would lead one to believe that increasing the amount of nylon heat stabilizer, while maintaining PMP heat stabilizer at a constant level, should result in a significant improvement in the heat aging properties of the film. Further comparison of EXAMPLES 10 and 11 shows that it was not the filler content, the combined amount of both nylon heat stabilizer and coloring agent, which resulted in insufficient elongation at break of EXAMPLE 10 since both EXAMPLES 10 and 11 contain 5% filler in the nylon core. Comparison of EXAMPLES 11 and 12 shows that a further decrease in nylon heat stabilizer plus the addition of a high viscosity nylon 6, 12 still further increases the elongation of the composite release film after heat aging for 40 hours at 177° C. Similarly, comparing EXAMPLES 12 and 13 shows that changing the tie resin between the nylon and PMP layers does not adversely effect the heat aging stability of the composite release film.

Examples 14–16 (Comparative)

The compositions according to Examples 14 through 16 provide comparative examples of the surprising effect of casting roll temperature on the interlayer peel strength of the coextruded release film product. The constituents used to form the compositions according to Examples 14 through 16 are listed in their respective weight percentages in TABLE 5. In addition, TABLE 5 lists the corresponding casting roll temperatures and the resultant interlayer peel strengths of Examples 14 through 16. For each composition, the constituents were processed on equipment similar to that discussed in Examples 1 through 4, although in some instances the die width was 67".

TABLE 5

|  | EXAMPLE 14 | EXAMPLE 15 | EXAMPLE 16 |
|---|---|---|---|
| Skin Composition | MX002 | MX002 | MX002 |
| Tie Composition | Admer QF500A | Admer QF500A | Admer QF500A |
| Core Composition | 60:25:15 195 FAV Nylon 6: Vydyne 76HF Q294: Grilon CR9 | 60:25:15 195 FAV Nylon 6: Vydyne 76HF Q294: Grilon CR9 | 60:25:15 195 FAV Nylon 6: Vydyne 76HF Q294: Grilon CR9 |
| Additional Copper Halide Heat Stabilizer | 3% | 3% | 3% |
| Skin Polymer Melt Temperature (° C.) | 316 | 316 | 316 |
| Tie Polymer Melt Temperature (° C.) | 268 | 268 | 268 |
| Core Polymer Melt Temperature (° C.) | 271 | 271 | 271 |
| Casting Roll Temperature (° C.) | 79 | 52 | 24 |
| MD Ultimate Strength (kpsi) | 14 | 14 | 15 |
| TD Ultimate Strength (kpsi) | 10 | 10 | 12 |
| MD Strain at Break (%) | 340 | 350 | 320 |
| TD Strain at Break (%) | 380 | 390 | 390 |
| Peel Strength (pounds/inch) | 160 | 150 | 300 |

The results in TABLE 5 show the dramatic, and surprising, effect of casting roll temperature on the interlayer peel strength. It is well know in the art that significant decreases in the casting roll temperature can reduce the interlayer bond strength, rather than increase it, due to the high degree of strain introduced into the tie layer as a result of the sudden quenching of the melt. EXAMPLE 16 is surprising, in that the interlayer peel strength is significantly improved, while at the same time the physical strength of the multilayer release film are not compromised.

Examples 17 and 18

In addition to the thermal stability of the composite release films the materials must be flexible enough to be easily handled while robust enough to be stripped from the composite after the curing cycle has been completed. As a comparative examples, the mechanical properties of a 1.9 mil monolayer TPX MXOO2 film, Mitsui X-22, EXAMPLE 17, and fluorinated ethylene propylene film, EXAMPLE 18 are used. Some of the physical properties of various examples are discussed in TABLE 6, the data for which was determined on films which had not been subjected to thermal aging at 177° C. for 40 hours. TABLE 7 list the properties after thermal aging for 40 hours at 177° C. for comparative EXAMPLES 17 and 18. The properties listed in TABLE 6 are important because those skilled in the art of aerospace composite fabrication have qualitatively determined that the release film described in composition EXAMPLE 17 is not flexible enough to fabricate small complex parts, whereas the release film described in EXAMPLE 18 is of sufficient flexibility to produce small and complex parts. Based on these qualitative flexability criteria, the Young's Modulus or Tensile Modulus is used as a measure of a release films stiffness, and as a means of determining a release films fitness for use in complex composite fabrication. The physical properties, including tensile modulus, ultimate strength, and ultimate elongation, of the films were determined on non-heat aged samples in accordance with ASTM D882. The tear properties of the films were determined in accordance with ASTM D1004, and are reported as the Graves, or Initial, force required to initiate a tear in the film. The interlayer bond strengths were determined in accordance with accepted ASTM techniques and are reported in grams per inch, where applicable.

TABLE 6

|  | EXAMPLE 17 | EXAMPLE 18 | EXAMPLE 5 | EXAMPLE 8 | EXAMPLE 9 | EXAMPLE 12 | EXAMPLE 13 |
|---|---|---|---|---|---|---|---|
| Film Thickness |  |  |  |  |  |  |  |
| ($\mu$m) | 48 | 23 | 25 | 25 | 25 |  |  |
| (m) |  |  |  |  |  | 25 | 25 |
| MD Tensile Modulus |  |  |  |  |  |  |  |
| (kg/cm$^2$) | 8350 | 5300 | 8750 | 6420 | 6060 |  |  |
| (kpsi) |  |  |  |  |  | 5530 | 5100 |
| TD Tensile Modulus |  |  |  |  |  |  |  |
| (kg/cm$^2$) | 8300 | 6000 | 8600 | 6060 | 5700 |  |  |
| (kpsi) |  |  |  |  |  | 5860 | 5750 |
| MD Ultimate Strength |  |  |  |  |  |  |  |
| (kg/cm$^2$) | 434 | 490 | 970 | 890 | 890 |  |  |
| (psi) |  |  |  |  |  | 790 | 820 |
| TD Ultimate Strength |  |  |  |  |  |  |  |
| (kg/cm$^2$) | 329 | 290 | 880 | 590 | 750 |  |  |
| (psi) |  |  |  |  |  | 800 | 720 |
| MD Ultimate Elongation (%) | 275 | 250 | 310 | 325 | 360 | 310 | 310 |
| TD Ultimate Elongation (%) | 370 | 350 | 380 | 360 | 380 | 390 | 370 |
| MD Graves Tear |  |  |  |  |  |  |  |
| (gms/25.4 micron) | 230 | 240 | 360 | Not Determined | Not Determined |  |  |
| (gms/mil) |  |  |  |  |  | 400 | 320 |

TABLE 6-continued

|  | EXAMPLE 17 | EXAMPLE 18 | EXAMPLE 5 | EXAMPLE 8 | EXAMPLE 9 | EXAMPLE 12 | EXAMPLE 13 |
|---|---|---|---|---|---|---|---|
| TD Graves Tear |  |  |  |  |  |  |  |
| (gms/25.4 micron) | 250 | 280 | 410 | Not Determined | Not Determined |  |  |
| (gms/mil) |  |  |  |  |  | 410 | 380 |
| Peel Strength |  |  |  |  |  |  |  |
| (gms/2.54 cm) | Not Applicable | Not Applicable | 140 | 180 | 160 |  |  |
| (g/inch) |  |  |  |  |  | 200 | >1000 |

From the foregoing examples it can be seen that both heat stabilized polyamide and heat stabilized polymethylpentene layers are required in order to achieve a film having good thermal stability. In addition, the specified nylon blend is required in order to attain a multilayered film which is soft enough to conform to a mold.

While the present invention has been particularly shown and described with reference to preferred embodiments, it will be readily appreciated by those of ordinary skill in the art that various changes and modifications may be made without departing from the spirit and scope of the invention. It is intended that the claims be to interpreted to cover the disclosed embodiment, those alternatives which have been discussed above and all equivalents thereto.

What is claimed is:

1. A non-oriented, multilayered film comprising:
   a) a polyamide layer comprised of a heat stabilizer; and polyamide blend comprising:
      i) from about 30% to about 80% by weight of the blend of a nylon 6 polymer having a number average molecular weight of at least about 40,000;
      ii) from about 10% to about 30% by weight of the blend of a nylon 6,66 copolymer having a number average molecular weight of at least about 15,000;
      iii) from about 5% to about 40% by weight of the blend of a nylon 6,12 copolymer having a number average molecular weight of at least about 10,000;
   b) a polymethylpentene layer comprised of a heat stabilizer; and at least one polymethylpentene homopolymer, polymethylpentene containing copolymer or a blend thereof; and
   c) an adhesive interlayer attached between a surface of said polyamide layer and a surface of said polymethylpentene layer.

2. The film of claim 1 wherein the adhesive interlayer is comprised of a blend of a maleated polyolefin, and a polymethylpentene homopolymer or polymethylpentene containing copolymer.

3. The film of claim 1 wherein the polymethylpentene homopolymer comprises poly(4-methyl-1-pentene).

4. The film of claim 1 wherein the a heat stabilizer component of the polyamide layer comprises a copper halide.

5. The film of claim 1 wherein the a heat stabilizer component of the polymethylpentene layer comprises a phenolic, sulfuric, and/or phosphorous compound.

6. The film of claim 1 which has an increase or decrease in its linear dimensions of no more than about 3% when subjected to a temperature of 165° C.

7. The film of claim 1 further comprising another polymethylpentene layer comprising a heat stabilizer; and at least one polymethylpentene homopolymer, polymethylpentene containing copolymer or a blend thereof attached to another surface of said polyamide layer by another adhesive interlayer therebetween.

8. The film of claim 7 which has a total thickness of from about 15 μm to about 30 μm.

9. The film of claim 7 which maintains its integrity as a film when maintained in an air or nitrogen atmosphere at from about 3 to about 10 atmospheres of pressure at a temperature of from about 60° C. to about 170° C. for from about 3 to about 20 hours.

10. A release film comprised of the film of claim 1.

11. A release film comprised of the film of claim 7.

12. A non-oriented, multilayered film comprising:
   a) a polyamide layer comprised of a heat stabilizer; and polyamide blend comprising:
      i) from about 30% to about 80% by weight of the blend of a nylon 6 polymer having a number average molecular weight of at least about 40,000;
      ii) from about 10% to about 30% by weight of the blend of a nylon 6,66 copolymer having a number average molecular weight of at least about 15,000;
      iii) from about 5% to about 40% by weight of the blend of a nylon 6,12 copolymer having a number average molecular weight of at least about 10,000;
   b) a polymethylpentene layer comprised of a heat stabilizer; and at least one polymethylpentene homopolymer, polymethylpentene containing copolymer or a blend thereof; and
   c) an adhesive interlayer attached between a surface of said polyamide layer and a surface of said polymethylpentene layer;
   d) an additional polymethylpentene layer comprised of a heat stabilizer; and at least one polymethylpentene homopolymer, polymethylpentene containing copolymer or a blend thereof; and
   e) another adhesive interlayer attached between another surface of said polyamide layer and a surface of said additional polymethylpentene layer.

13. The film of claim 12 wherein the adhesive interlayer is comprised of a blend of a maleated polyolefin, and a polymethylpentene homopolymer or polymethylpentene containing copolymer.

14. The film of claim 12 wherein the polymethylpentene homopolymer comprises poly(4-methyl-1-pentene).

15. The film of claim 12 wherein the a heat stabilizer component of the polyamide layer comprises a copper halide.

16. The film of claim 12 wherein the a heat stabilizer component of the polymethylpentene layer comprises a phenolic, sulfuric, and/or phosphorous compound.

17. The film of claim 12 which has an increase or decrease in its linear dimensions of no more than about 3% when subjected to a temperature of 165° C.

18. The film of claim 12 which has a total thickness of from about 15 µm to about 30 µm.

19. The film of claim 12 which maintains its integrity as a film when maintained in an air or nitrogen atmosphere at from about 3 to about 10 atmospheres of pressure at a temperature of from about 60° C. to about 170° C. for from about 3 to about 20 hours.

20. An article which comprises
I.) a non-oriented, multilayered film comprising:
   a) a polyamide layer comprised of a heat stabilizer; and polyamide blend comprising:
      i) from about 30% to about 80% by weight of the blend of a nylon 6 polymer having a number average molecular weight of at least about 40,000;
      ii) from about 10% to about 30% by weight of the blend of a nylon 6,66 copolymer having, a number average molecular weight of at least about 15,000;
      iii) from about 5% to about 40% by weight of the blend of a nylon 6,12 copolymer having a number average molecular weight of at least about 10,000;
   b) a polymethylpentene layer comprised of a heat stabilizer; and at least one polymethylpentene homopolymer, polymethylpentene containing copolymer or a blend thereof; and
   c) an adhesive interlayer attached between a surface of said polyamide layer and a surface of said polymethylpentene layer; and
II.) a fiber reinforced epoxy, phenolic or polyacrylate composition applied on a surface of the multilayered film.

21. An article which comprises
I.) a non-oriented, multilayered film comprising:
   a) a polyamide layer comprised of a heat stabilizer; and polyamide blend comprising:
      i) from about 30% to about 80% by weight of the blend of a nylon 6 polymer having a number average molecular weight of at least about 40,000;
      ii) from about 10% to about 30% by weight of the blend of a nylon 6,66 copolymer having a number average molecular weight of at least about 15,000;
      iii) from about 5% to about 40% by weight of the blend of a nylon 6,12 copolymer having a number average molecular weight of at least about 10,000;
   b) a polymethylpentene layer comprised of a heat stabilizer; and at least one polymethylpentene homopolymer, polymethylpentene containing copolymer or a blend thereof; and
   c) an adhesive interlayer attached between a surface of said polyamide layer and a surface of said polymethylpentene layer;
   d) an additional polymethylpentene layer comprised of a heat stabilizer; and at least one polymethylpentene homopolymer, polymethylpentene containing copolymer or a blend thereof; and
   e) another adhesive interlayer attached between another surface of said polyamide layer and a surface of said additional polymethylpentene layer; and
II.) a fiber reinforced epoxy, phenolic or polyacrylate composition applied on a surface of the multilayered film.

22. A process for producing a multilayered film comprising:
I) coextruding layers comprising
   a) a polyamide layer comprised of a heat stabilizer; and a polyamide blend comprising:
      i) from about 30% to about 80% by weight of the blend of the blend of a nylon 6 polymer having a number average molecular weight of at least about 40,000;
      ii) from about 10% to about 30% by weight of the blend of a nylon 6,66 copolymer having a number average molecular weight of at least about 15,000;
      iii) from about 5% to about 40% by weight of the blend of a nylon 6,12 copolymer having a number average molecular weight of at least about 10,000;
   b) a polymethylpentene layer comprised of a heat stabilizer; and at least one polymethylpentene homopolymer, polymethylpentene containing copolymer or a blend thereof; and
   c) an adhesive interlayer attached between a surface of said polyamide layer and a surface of said polymethylpentene layer;
II) forming the coextruded layers into a multilayered film.

23. A process for producing a multilayered film comprising:
I) coextruding layers comprising
   a) a polyamide layer comprised of a heat stabilizer; and a polyamide blend comprising:
      i) from about 30% to about 80% by weight of the blend of a nylon 6 polymer having a number average molecular weight of at least about 40,000;
      ii) from about 10% to about 30% by weight of the blend of a nylon 6,66 copolymer having a number average molecular weight of at least about 15,000;
      iii) from about 5% to about 40% by weight of the blend of a nylon 6,12 copolymer having a number average molecular weight of at least about 10,000;
   b) a polymethylpentene layer comprised of a heat stabilizer; and at least one polymethylpentene homopolymer, polymethylpentene containing copolymer or a blend thereof;
   c) an adhesive interlayer attached between a surface of said polyamide layer and a surface of said polymethylpentene layer;
   d) an additional polymethylpentene layer comprised of a heat stabilizer; and at least one polymethylpentene homopolymer, polymethylpentene containing copolymer or a blend thereof; and
   e) another adhesive interlayer attached between another surface of said polyamide layer and a surface of said additional polymethylpentene layer;
II) forming the coextruded layers into a multilayered film.

24. A process for producing an article which comprises:
I.) providing a non-oriented, multilayered film comprising:
   a) a polyamide layer comprised of a heat stabilizer; and polyamide blend comprising:
      i) from about 30% to about 80% by weight of the blend of a nylon 6 polymer having a number average molecular weight of at least about 40,000;
      ii) from about 10% to about 30% by weight of the blend of a nylon 6,66 copolymer having a number average molecular weight of at least about 15,000;
      iii) from about 5% to about 40% by weight of the blend of a nylon 6,12 copolymer having a number average molecular weight of at least about 10,000;

b) a polymethylpentene layer comprised of a heat stabilizer; and at least one polymethylpentene homopolymer, polymethylpentene containing copolymer or a blend thereof; and c) an adhesive interlayer attached between a surface of said polyamide layer and a surface of said polymethylpentene layer; and II.) applying and curing a fiber reinforced epoxy, phenolic or polyacrylate composition on a surface of the multilayered film.

25. The process of claim 24 further comprising removing the cured composition from the surface of the multilayered film.

26. A process for producing an article which comprises:

I.) providing a non-oriented, multilayered film comprising:
   a) a polyamide layer comprised of a heat stabilizer; and polyamide blend comprising:
      i) from about 30% to about 80% by weight of the blend of a nylon 6 polymer having a number average molecular weight of at least about 40,000;
      ii) from about 10% to about 30% by weight of the blend of a nylon 6,66 copolymer having a number average molecular weight of at least about 15,000;
      iii) from about 5% to about 40% by weight of the blend of a nylon 6,12 copolymer having a number average molecular weight of at least about 10,000;
   b) a polymethylpentene layer comprised of a heat stabilizer; and at least one polymethylpentene homopolymer, polymethylpentene containing copolymer or a blend thereof; and
   c) an adhesive interlayer attached between a surface of said polyamide layer and a surface of said polymethylpentene layer;
   d) an additional polymethylpentene layer comprised of a heat stabilizer; and at least one polymethylpentene homopolymer, polymethylpentene containing copolymer or a blend thereof; and
   e) another adhesive interlayer attached between another surface of said polyamide layer and a surface of said additional polymethylpentene layer; and II.) applying and curing a fiber reinforced epoxy, phenolic or polyacrylate composition on a surface of the multilayered film.

27. The process of claim 26 further comprising removing the cured composition from the surface of the multilayered film.

\* \* \* \* \*